May 4, 1954 M. M. DROGIN 2,677,444
HANDLE CONSTRUCTION
Filed July 24, 1951
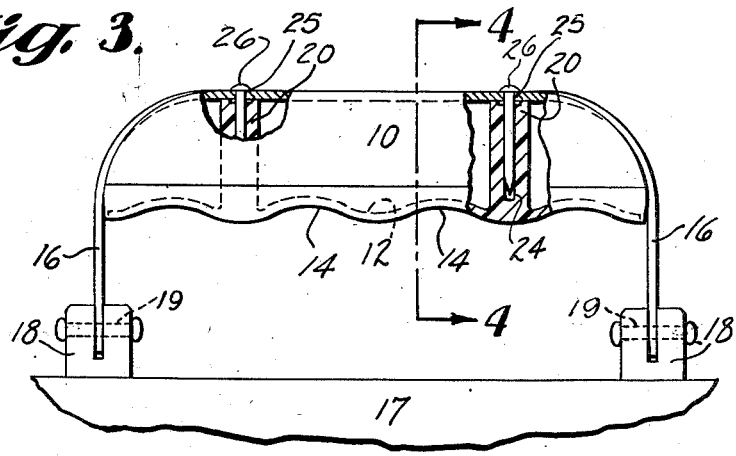
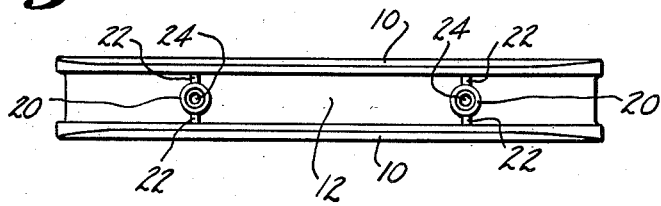
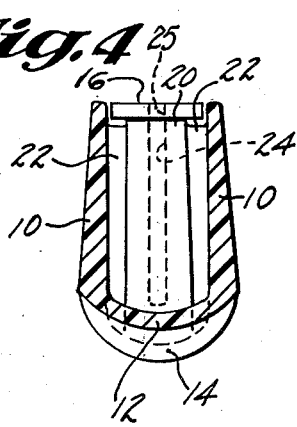
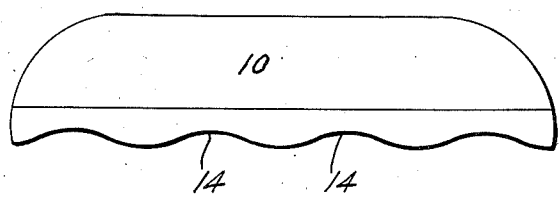
INVENTOR.
Martin M. Drogin
BY Louis Necho
Attorney Patented May 4, 1954

2,677,444

UNITED STATES PATENT OFFICE 2,677,444

HANDLE CONSTRUCTION

Martin M. Drogin, Philadelphia, Pa., assignor to General Plastics Corporation of America, Philadelphia, Pa., a corporation of Pennsylvania Application July 24, 1951, Serial No. 238,297

1 Claim. (190—57)

As far as I am aware, it is now the practice to make the handle of a piece of luggage from a suitably shaped piece of wood and to cover the handle with some suitable material from which the piece of luggage is made. This procedure is expensive and the covering of the handle sooner or later wears out, works loose, and gets stained.

Accordingly, the object of my invention is to produce an improved handle construction which is less expensive and more durable than the type of handle above referred to.

The nature and advantages of the invention will be understood from the following specification and the accompanying drawings in which:

Fig. 1 is a side elevational view of a handle embodying my invention, the same being shown detached.

Fig. 2 is a top plan view of the same.

Fig. 3 is a view, partly in side elevation and partly in vertical section, showing the application of my improved handle to a piece of luggage.

Fig. 4 is an enlarged section on line 4—4 on Fig. 3.

The handle of my invention is molded of some suitable thermo-setting material. Since a large number of such materials is available on the market, and since the art of molding, or otherwise forming such materials into the desired shapes, and in the desired color and degree of transparency, is well known, it is unnecessary to describe such materials or the manner in which they are formed, shaped, or colored. It is sufficient to say that the handle is formed of any desired size, shape, color or degree of transparency. I have discovered that this manner of producing a handle is considerably less expensive than shaping a piece of wood and covering it with leather or other material. Also, a handle made according to my invention is as strong, or stronger, and is as light, or lighter than a handle made of wood and covered. Furthermore a handle made according to my invention is more easily cleaned than a fabric or leather covered wooden handle.

The handle of my invention is formed of two elongated side walls 10 and a bottom wall 12 connecting the lower edges of the side walls. The side and bottom walls are suitably shaped to give them a better appearance and to provide a comfortable grip. For example, the ends and the top of the handle are nicely rounded and the bottom thereof is undulated as at 14. Between the side walls 10 are a pair of longitudinally spaced lugs 20 which extend from the bottom wall 12 to a point just below the upper edges of the side walls. The lugs 20 are connected to the side walls 10 by means of webs 22 and are provided with bores 24. The handle is secured to the top of a piece of luggage 17 by means of a strap 16 the ends of which are pivotally secured, as at 19, to lugs or fastening members 18 carried by, or forming part of, the frame of the luggage. The members 18 are present in conventional luggage and form no part of the present invention. The strap is made of flexible, non-rusting sheet metal, or its equivalent, and it is provided with holes 25 which, when the strap is in position, register with bores 24 in lugs 20. Nails 26 are passed through holes 25 and driven into bores 24 to fasten the strap to the handle. It will be noted that, when the strap is fastened to the handle, its upper surface will be substantially flush with the upper edges of side walls 10. Also, the nails engage the lugs 20 as firmly as they engage a piece of wood and without splitting the lugs 20.

From the foregoing it will be seen that my molded handle is much cheaper than a shaped piece of wood covered with fabric, or leather, that the connecting strap 16 is nailed to my handle in the same manner as it is nailed to a wooden handle, and that my improved handle can be made in any desired color.

What I claim is:

A handle construction for use on a piece of luggage, or other object, said construction including a molded body member formed of a thermosetting, synthetic material and having a pair of parallel, spaced, elongated, vertical side walls and a bottom wall connecting the bottom edges of said side walls, a pair of longitudinally spaced lugs carried by said bottom wall and extending upwardly between said side walls, webs connecting said lugs to said side walls, there being a bore formed in each of said lugs, a flexible inverted V-shaped strap having holes therein adapted to register with the bores in said lugs, and nails passing through said holes and said bores and firmly engaging said lugs to secure said strap to said lugs, the upper ends of said lugs being slightly spaced from the upper edges of said side walls whereby, when said strap is secured to said lugs, its upper surface will be substantially flush with the upper edges of said side walls.

References Cited in the file of this patent

UNITED STATES PATENTS

| Number | Name | Date |
|---|---|---|
| 234,227 | Booth | Nov. 9, 1880 |
| 2,146,415 | Bradley | Feb. 7, 1939 |
| 2,158,641 | Stenberg | May 16, 1939 |
| 2,294,197 | Moore et al. | Aug. 25, 1942 |
| 2,314,522 | Sette | Mar. 23, 1943 |
| 2,483,307 | Wheary, Jr. | Sept. 27, 1949 |
| 2,517,369 | Wolfson | Aug. 1, 1950 |